(12) United States Patent
Koka et al.

(10) Patent No.: US 11,232,509 B1
(45) Date of Patent: Jan. 25, 2022

(54) EXPRESSION AND GESTURE BASED ASSISTANCE

(71) Applicant: Amazon Technologies, Inc., Seattle, WA (US)

(72) Inventors: Muralidhar Koka, Kirkland, WA (US); Sudarshan Narasimha Raghavan, Snoqualmie, WA (US); Yasser Baseer Asmi, Redmond, WA (US); Ammar Chinoy, Seattle, WA (US); Korwin Jon Smith, Seattle, WA (US); Dilip Kumar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/235,317

(22) Filed: Dec. 28, 2018

Related U.S. Application Data

(60) Division of application No. 15/068,435, filed on Mar. 11, 2016, now Pat. No. 10,176,513, which is a continuation of application No. 13/928,343, filed on Jun. 26, 2013, now abandoned.

(51) Int. Cl.
| | |
|---|---|
| *G06F 3/048* | (2013.01) |
| *G06Q 30/06* | (2012.01) |
| *G06F 3/01* | (2006.01) |
| *H04N 7/18* | (2006.01) |

(52) U.S. Cl.
CPC ........ *G06Q 30/0639* (2013.01); *G06F 3/011* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 6,236,736 B1 * | 5/2001 | Crabtree | G01S 3/7865 235/383 |
| 6,659,344 B2 | 12/2003 | Otto et al. | |
| 7,225,980 B2 | 6/2007 | Ku et al. | |

(Continued)

FOREIGN PATENT DOCUMENTS

| | | |
|---|---|---|
| CA | 2474254 A1 | 7/2003 |
| CN | 101149792 B | 6/2010 |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Hua Lu
(74) *Attorney, Agent, or Firm* — Athorus, PLLC

(57) ABSTRACT

This disclosure describes a system for assisting users in locating items from inventory locations and/or obtaining additional information about items. In some instances, a user may experience difficulty in locating an inventory item in a materials handling facility. By detecting one or more expressions presented by the user, an inventory management system may determine that assistance is to be provided to the user, determine and provide the appropriate assistance to the user.

26 Claims, 9 Drawing Sheets

(56) References Cited

U.S. PATENT DOCUMENTS

| | | | |
|---|---|---|---|
| 7,522,057 B2* | 4/2009 | Stern | G08B 21/0415 340/522 |
| 7,693,758 B1 | 4/2010 | Bacco et al. | |
| 7,949,568 B2 | 5/2011 | Fano et al. | |
| 7,983,448 B1* | 7/2011 | da Vitoria Lobo | G06K 9/6282 382/103 |
| 8,009,864 B2 | 8/2011 | Linaker et al. | |
| 8,094,026 B1 | 1/2012 | Green | |
| 8,175,925 B1 | 5/2012 | Rouaix | |
| 8,189,855 B2 | 5/2012 | Opalach et al. | |
| 8,264,422 B1* | 9/2012 | Persson | G06Q 10/087 345/8 |
| 8,423,431 B1 | 4/2013 | Rouaix et al. | |
| 8,571,702 B1* | 10/2013 | Haake | G06Q 10/047 700/216 |
| 8,630,924 B2 | 1/2014 | Groenevelt et al. | |
| 8,678,281 B2 | 3/2014 | Kangas et al. | |
| 8,688,598 B1 | 4/2014 | Shakes et al. | |
| 8,726,195 B2 | 5/2014 | Bill | |
| 9,235,928 B2 | 1/2016 | Medioni et al. | |
| 9,473,747 B2* | 10/2016 | Kobres | G06Q 30/00 |
| 10,250,939 B2* | 4/2019 | Tegreene | H04N 21/4402 |
| 2002/0113123 A1* | 8/2002 | Otto | G06Q 30/06 235/381 |
| 2003/0002712 A1* | 1/2003 | Steenburgh | G06K 9/00778 382/103 |
| 2004/0181467 A1 | 9/2004 | Raiyani et al. | |
| 2005/0006569 A1 | 1/2005 | Yoshiyuki | |
| 2005/0189412 A1 | 9/2005 | Hudnut et al. | |
| 2006/0206235 A1* | 9/2006 | Shakes | B65G 1/1373 700/216 |
| 2006/0256082 A1* | 11/2006 | Cho | G06F 1/1626 345/156 |
| 2008/0019589 A1* | 1/2008 | Yoon | G06K 9/00355 382/165 |
| 2008/0055087 A1 | 3/2008 | Horii et al. | |
| 2008/0055194 A1* | 3/2008 | Baudino | G06F 3/011 345/8 |
| 2008/0059570 A1* | 3/2008 | Bill | G06T 19/006 709/203 |
| 2008/0068170 A1 | 3/2008 | Ehrman et al. | |
| 2008/0077511 A1 | 3/2008 | Zimmerman | |
| 2008/0109114 A1 | 5/2008 | Orita et al. | |
| 2008/0183326 A1 | 7/2008 | Danelski | |
| 2008/0260212 A1* | 10/2008 | Moskal | G06K 9/00315 382/118 |
| 2008/0285791 A1* | 11/2008 | Suzuki | H04N 5/23218 382/100 |
| 2009/0003709 A1* | 1/2009 | Kaneda | G06K 9/00315 382/190 |
| 2009/0066513 A1 | 3/2009 | Kondo et al. | |
| 2009/0121017 A1 | 5/2009 | Cato et al. | |
| 2009/0245573 A1* | 10/2009 | Saptharishi | G06K 9/52 382/103 |
| 2010/0117959 A1* | 5/2010 | Hong | G06F 1/1626 345/158 |
| 2010/0134611 A1* | 6/2010 | Naruoka | G06K 9/00 348/77 |
| 2010/0138037 A1* | 6/2010 | Adelberg | G07F 9/026 700/241 |
| 2010/0191124 A1* | 7/2010 | Prokoski | G01K 13/20 600/473 |
| 2010/0277277 A1* | 11/2010 | Green | G07C 9/28 340/5.72 |
| 2011/0011936 A1 | 1/2011 | Morandi et al. | |
| 2011/0242025 A1* | 10/2011 | Wen | G06F 3/04883 345/173 |
| 2011/0295644 A1* | 12/2011 | Hara | G06Q 10/06315 705/7.25 |
| 2012/0206603 A1* | 8/2012 | Rekimto | G06K 9/00315 348/156 |
| 2012/0284132 A1* | 11/2012 | Kim | G07G 1/0081 705/20 |
| 2013/0021262 A1* | 1/2013 | Chen | G06F 3/0488 345/173 |
| 2013/0027561 A1* | 1/2013 | Lee | G06K 9/00302 348/150 |
| 2013/0035950 A1 | 2/2013 | Macdonald et al. | |
| 2013/0054333 A1 | 2/2013 | Ross et al. | |
| 2013/0057670 A1* | 3/2013 | Fukuda | G06Q 20/206 348/77 |
| 2013/0073703 A1 | 3/2013 | Das et al. | |
| 2013/0076898 A1* | 3/2013 | Philippe | A61B 50/10 348/143 |
| 2013/0110565 A1* | 5/2013 | Means, Jr. | G06Q 10/063 705/7.11 |
| 2013/0126611 A1 | 5/2013 | Kangas et al. | |
| 2013/0253700 A1 | 9/2013 | Carson et al. | |
| 2013/0265232 A1* | 10/2013 | Yun | G06F 3/011 345/158 |
| 2013/0284806 A1* | 10/2013 | Margalit | G06Q 30/06 235/382 |
| 2013/0290106 A1* | 10/2013 | Bradley | G06Q 90/20 705/14.64 |
| 2014/0019264 A1* | 1/2014 | Wachman | G06Q 30/0276 705/14.72 |
| 2014/0164176 A1 | 6/2014 | Kitlyar | |
| 2014/0244429 A1 | 8/2014 | Clayton et al. | |
| 2014/0244447 A1 | 8/2014 | Kim et al. | |
| 2014/0244488 A1 | 8/2014 | Kim et al. | |
| 2014/0253429 A1* | 9/2014 | Dai | G06T 7/11 345/156 |
| 2014/0279294 A1* | 9/2014 | Field-Darragh | H04B 5/0062 705/28 |
| 2014/0279713 A1 | 9/2014 | Calman et al. | |
| 2015/0012426 A1* | 1/2015 | Purves | G06Q 20/321 705/41 |
| 2015/0019391 A1 | 1/2015 | Kumar et al. | |
| 2015/0073907 A1* | 3/2015 | Purves | G06Q 20/32 705/14.58 |
| 2015/0074615 A1* | 3/2015 | Han | H04L 63/083 715/863 |
| 2015/0206081 A1* | 7/2015 | Lee | G06Q 10/06 705/7.13 |
| 2015/0208043 A1* | 7/2015 | Lee | G06Q 10/06311 348/150 |

FOREIGN PATENT DOCUMENTS

| | | |
|---|---|---|
| CN | 101976377 A | 2/2011 |
| JP | H0281806 A | 3/1990 |
| JP | 2000123086 A | 4/2000 |
| JP | 2001128814 A | 5/2001 |
| JP | 2002284317 A | 10/2002 |
| JP | 2005029391 A | 2/2005 |
| JP | 2006204473 A | 8/2006 |
| JP | 2009008966 A | 1/2009 |
| JP | 2009251625 A | 10/2009 |
| JP | 2011054038 A | 3/2011 |
| JP | 2011253344 A | 12/2011 |
| JP | 2012028948 A | 2/2012 |
| JP | 2013033512 A | 2/2013 |
| JP | 2013054593 A | 3/2013 |
| WO | 2010004719 A1 | 1/2010 |
| WO | 2013016803 A1 | 2/2013 |
| WO | 2013033442 A1 | 3/2013 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

Vaive Kalnikaite et al., "How to Nudge In Situ: Designing Lambent Devices to Deliver Information Salience in Supermarkets", Ubicomp '11 Proceedings of the 13th International Conference on Ubiquitous Computing, 2011, pp. 11-20, Publisher: ACM New York, NY, USA.

\* cited by examiner

EXPRESSION AND GESTURE BASED ASSISTANCE

CROSS-REFERENCE TO RELATED APPLICATIONS

This application is Divisional of U.S. application Ser. No. 15/068,435, filed Mar. 11, 2016, titled "Using Gestures And Expressions To Assist Users," which is a Continuation of U.S. application Ser. No. 13/928,343, filed Jun. 26, 2013, titled "Using Gestures And Expressions To Assist Users," both of which are incorporated herein by reference in their entirety.

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in a storage area, or fulfillment centers that can be used to replenish inventory located in the shopping areas and/or to satisfy orders for items that are placed through other channels (e.g., e-commerce). Other examples of entities that maintain inventory include libraries, museums, rental centers, and the like. In each instance, the user (e.g., picker, user, customer) must first locate the item and retrieve the item for use and/or purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
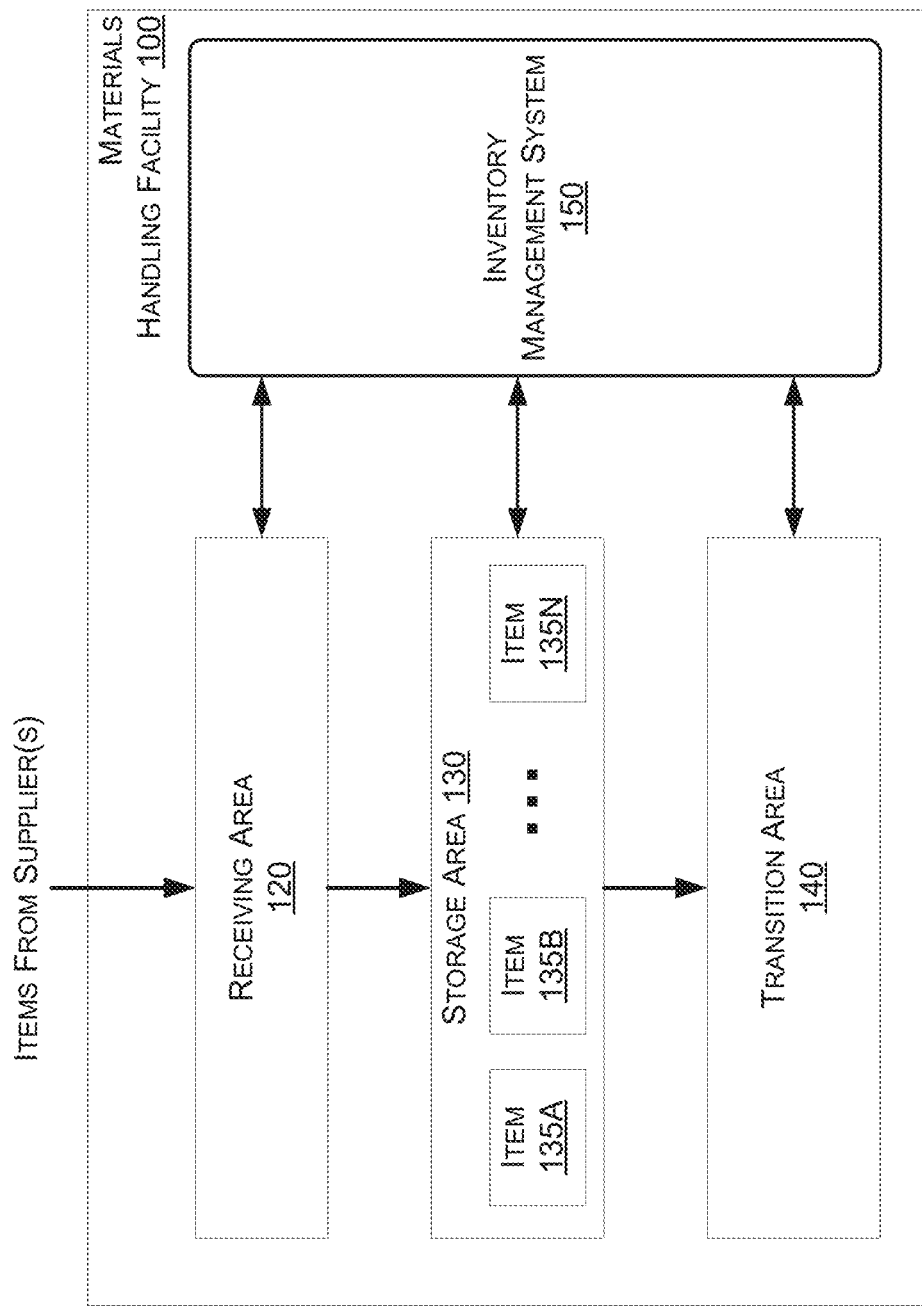
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes a system for assisting users in locating items from inventory locations. In some instances, a user may experience difficulty in locating an inventory item in a materials handling facility. By detecting one or more expressions presented by the user, an inventory management system may determine that assistance is to be provided to the user. For example, if the user is not able to locate an area within the materials handling facility where the item is located, the user may be walking up and down the aisles scanning for the appropriate types of items. By detecting the behavior, which may be represented by macroexpressions of the user, the inventory management system can determine that assistance is to be provided to the user. In another example, a user may be in a specific area of the materials handling facility but presenting expressions illustrating that they are having difficulty locating an item. For example, one or more microexpressions illustrating frustration may be presented by the user and detected by the inventory management system. Based on the user's expressions and/or past information about the user, the inventory management system may determine that assistance is to be provided to the user.

When assistance is to be provided to a user, it may be done in one or more forms. For example, in some implementations, assistance may be provided to the user in the form of audible, visual, and/or haptic information. For example, a location of the item may be provided by projecting a light onto the item in the materials handling facility to identify its location. In another example, the inventory management system may ask the user if assistance is needed. In still another example, an associate may be dispatched to the location of the user to provide assistance. The associate may be a human or robotic system that is configured to provide assistance to users within the materials handling facility. The assistance may include identifying a location of an item to a user, providing information about one or more items to the user, providing non-item related information, providing medical assistance, providing assistance in locating a child, or providing any other form of assistance to the user.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store them until a customer orders or retrieves one or more of the items. The general flow of items through materials handling facility 100 is indicated using arrows. Specifically, as illustrated in this example, items 135 may be received from one or more suppliers, such as manufacturers, distributors, wholesalers, etc. at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, or as a user progresses through the materials handling facility 100, the corresponding items 135 may be selected or "picked" from storage area 130. For example, in one implementation, a user may have a list of items to pick and may progress through the materials handling facility picking items 135 from the storage area 130. In other implementations, materials handling facility employees may pick items 135 using written or electronic pick lists derived from customer orders.

As discussed in more detail below, as the user progresses through the materials handling facility 100, it may be determined based on expressions (e.g., microexpressions, macroexpression, gestures) presented by the user as to whether assistance is needed. For example, a user may present a predefined gesture, such as raising their hand to notify the inventory management system 150 that assistance is to the provided to the user. In another example, the inventory management system 150 may detect one or more microexpressions of the user and determine based on those expressions that assistance is to be provided to the user.

Figure 2:
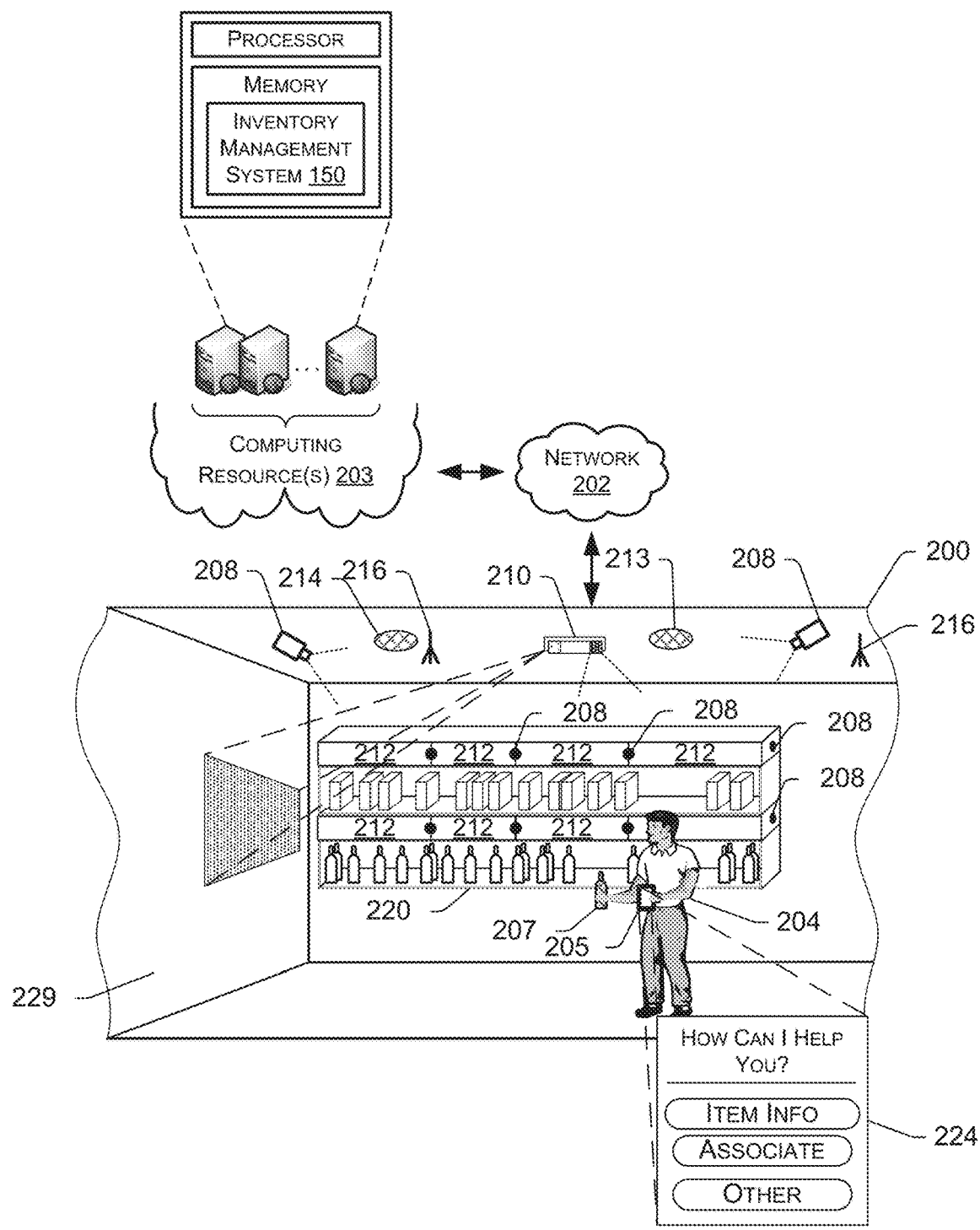
FIG. 2 is a block diagram illustrating additional details of a materials handling facility, according to some implementations.

FIG. 2 shows additional components of a materials handling facility 200, according to some implementations. Generally, the materials handling facility 200 may include one or more image capture devices, such as cameras 208. For example, one or more cameras 208 may be positioned in locations of the materials handling facility 200 so that images of locations and/or users within the materials handling facility can be captured. In some implementations, the image capture devices 208 may be positioned overhead, such as on the ceiling to capture images of users and/or locations within the materials handling facility. In addition, in some implementations, one or more cameras 208 may be positioned on or inside of inventory locations. For example, a series of cameras 208 may be positioned on external portions of the inventory locations and positioned to capture images of user's and/or the location surrounding the inventory location. Likewise, one or more cameras 208 may be positioned within the inventory locations to capture images of items stored in the inventory locations.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to camera's, other input devices, such as pressure sensors, infrared sensors, a scale, a light curtain, etc. may be utilized with the implementations described herein. For example, a pressure sensor and/or a scale may be used to detect when an item is added and/or removed from inventory locations.

In some implementations, a user 204 located in the materials handling facility 200 may possess a portable device 205 and obtain information about items 207 located within the materials handling facility 200. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances the portable device 205 may operate in conjunction with or may otherwise utilize or communicate with one or more components of the inventory management system 150. Likewise, components of the inventory management system 150 may interact and communicate with the portable device 205 as well as identify the user, communicate with the user via other means and/or communicate with other components of the inventory management system 150.

Generally, the inventory management system 150 may include one or more input/output devices, such as imaging devices (e.g., cameras) 208, projectors 210, displays 212, speakers 213, microphones 214, etc. to facilitate communication between the inventory management system 150 and the user 204, such as providing assistance to the user. In some implementations, multiple input/output devices may be distributed within the materials handling facility. For example, there may be multiple imaging devices, such as cameras located on the ceilings and/or cameras (such as pico-cameras) located in the aisles near the inventory items.

Likewise, the inventory management system 150 may also include one or more communication devices, such as wireless antennas 216 that facilitate wireless communication (e.g., Wi-Fi, Near Field Communication (NFC), Bluetooth) between the inventory management system 150 and the portable device 205. The inventory management system 150 may also include one or more computing resource(s), such as server system 203 that may be local to the environment (e.g., materials handling facility), remote from the environment, or any combination thereof.

The inventory management system 150 may utilize antennas 216 within the materials handling facility to create a local wireless network 202 (e.g., Wi-Fi) so that the portable device 205 can connect to and communicate with the inventory management system 150. Likewise, in instances when one or more of the components of the inventory management system 150 are remote from the materials handling facility, they may communicate with other components of the inventory management system 150 and/or the portable device 205 via the network 202.

The following is an example use case that determines assistance is to be provided to a user within the materials handling facility and provides that assistance to the user. Upon entering the materials handling facility, the inventory management system 150 may identify the user (e.g., facial recognition, user ID cart, user provided information). Upon identifying the user, information (e.g., item retrieval history, view history, purchase history) may be retrieved from a data store. Likewise, the user may provide to the inventory management system 150 and/or have an associated pick list identifying items to be retrieved from the materials handling facility retrieved from a data store.

In some implementations, as the user progresses through the materials handling facility 200, an imaging device 208 may obtain/capture one or more images of the user 204 and provide the image(s) to the computing resource(s) 203 for processing. The computing resource(s) 203 may process the image(s) to identify any expressions presented by the user (e.g., gestures, macroexpressions, microexpressions). For example, the images may be processed to detect changes in facial expressions. Those changes may be analyzed to detect expressions presented by the user. If any expressions are presented, the inventory management system 150 may compare those expressions with expression information maintained by the inventor management system 150 and determine whether assistance is to be provided to the user.

Likewise, other unique identifiers (e.g., the color of the user's shirt, shoes, hat, pants) may be detected and used to assist in identifying the user as the user moves around the materials handling facility. For example, if the user is wearing a bright yellow shirt, that shirt may be identified and used as a temporary data point for use in identifying the user as they move around the materials handling facility that day.

As the user moves around the materials handling facility, the inventory management system 150 may assist the user in discovering information about items by processing images collected by input/output components 208-216 positioned around the materials handling facility. For example, imaging devices 208 may be used to obtain/capture images within the materials handling facility 200 that are processed by the computing resource(s) 203 to identify the location of the user 204 and/or expressions presented by the user 204. Likewise, microphones 214 may record sounds made by the user and the computing resource(s) may process those sounds to determine if assistance is to be provided to the user based on those inputs. For example, if the user is talking to themself, or another person, about where an item is located within the materials handling facility, such information may be captured by the microphone and processed by the computing resources. In response, the inventory management system 150 may determine to provide assistance to the user in the form on a visual indication as to the products location. In another example, if the inventory management system 150 cannot determine the product for which the user is searching, the inventory management system 150 may utilize other information about the user (e.g., past purchase history, currently picked items) to identify and suggest an item as the searched for item. In still other examples, the inventory management system 150 may ask the user if they are searching for a particular item.

In addition to, or as an alternative to visual and/or audio location determination, the inventory management system 150 may also utilize other techniques, such as triangulation between antennas 216, to determine the location of the user 204 as the user moves through the materials handling facility 200. In other examples, the portable device 205 may include a global positioning system (GPS) receiver that obtains GPS information as to the location of the portable device 205. In such an implementation, the portable device 205 may provide the received GPS information to the inventory management system 150.

When the user 204 is searching for an item but staying in a specific area of the materials handling facility 200, the inventory management system 150 may detect one or more expressions of the user and determine based on those expressions whether assistance is to be provided.

Upon determining that assistance is to be provided, the inventory management system 150 may consider the user profile of the user when determining the form of assistance to provide. Likewise, the inventory management system 150 may determine whether it knows the item for which the user is searching or if additional information is needed. If the item is known, the inventory management system may identify the location of the item to the user. Identifying may be accomplished by, for example, projecting a light on the item, presenting on a display a location of the item, providing audible information to the user as to the location of the item, and the like. In addition, the inventory management system 150 may consider any user preference(s) when determining the form of assistance to provide. For example, some users may prefer audible assistance while others may prefer in-person assistance.

Once the assistance is provided, the inventory management system 150 may determine whether the assistance is to continue or terminate. For example, if the user picks the item and continues, it may be determined that assistance is to be terminated. In another instance, if additional expressions of frustration are presented, the inventory management system 150 may determine that assistance is to continue. In some examples, the form of assistance may alter. For example, if the initial assistance was audio-only and additional expressions of frustration are presented by the user following the assistance, the inventory management system 150 may determine that the assistance form should be modified, and dispatch an associate to provide assistance to the user 204.

While the above example discusses providing assistance to a user in locating an item, in other implementations other forms of assistance may be provided. For, example in some implementations the user may have selected an item but the inventory management system 150 may determine that assistance is to be provided about the item. For example, additional information about the item (e.g., specifications, compatibility, expiration date) may be presented to the user.

If information is presented to the user from the inventory management system 150 via the portable device 205, the user 204 may interact with the inventory management system 150 via the portable device 205. For example, the user 204 may interact with the portable device 205 by selecting (e.g., via a touch screen) one of the controls 224, 226, 228, 230. For example, if the user selects the "Item Info" control 224, the portable device 205 may submit a request to the inventory management system 150 for additional item information. The inventory management system 150, upon receiving an additional item information request from the portable device 205, may retrieve additional item information and provide it back to the user via the portable device 205. In other implementations, the additional item information may be provided via one or more displays located within the materials handling facility and/or by other means. For example, the inventory management system 150 may identify a display location near the user for presenting the information. If the user is in a location where there are displays, such as displays 212 that are available for use, the display 212 closest to the user 204 may be selected for presenting the additional item information to the user. Alternatively, a projector 210 may be used to project additional item information onto a surface area 229 near the user 204.

Other assistance options relating to an item may also be presented to the user. For example, if the materials handling facility 150 is a library and the inventory management system 150 detects microexpressions of frustration from a user searching in the history section it may determine that assistance is to be provided. Likewise, the inventory management system 150 may identify that the user frequently selects books relating to Abraham Lincoln and provide audible assistance asking the user if they are searching for a new Abraham Lincoln related book.

Figure 3:
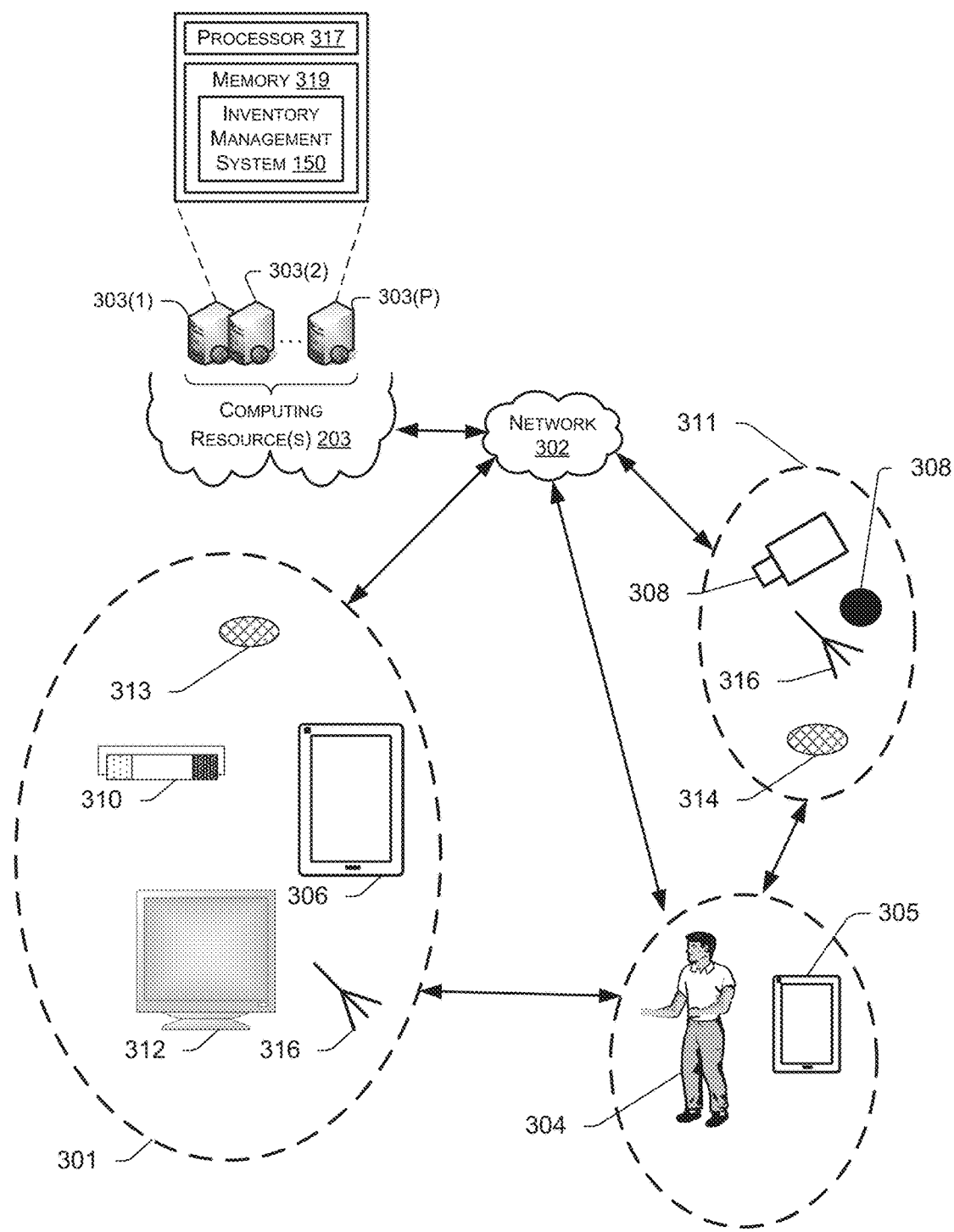
FIG. 3 shows additional components and communication paths between component types utilized in a materials handling facility of FIG. 1, according to some implementations.

FIG. 3 shows additional components and communication paths between component types utilized in an inventory management system 150 of FIG. 1, in accordance with some implementations. As discussed above, the portable device 305 may communicate and interact with various components of an inventory management system 150 over a variety of communication paths. Generally, the inventory management system 150 may include input components 301, output components 311 and computing resource(s) 203. The input components 301 may include an imaging device 308, microphone 314, antenna 316, or any other component that is capable of receiving input about it surrounding environment, from the user of the portable device and/or from the portable device. The output components 311 may include a projector 310, a portable device 306, a display 312, an antenna 316, a radio (not shown), speakers 313 and/or any other component that is capable of providing assistance in the form of output to its surrounding environment, the user and/or the portable device.

The inventory management system 150 may also include computing resource(s) 203. The computing resource(s) 203 may be local to the environment (e.g., materials handling facility), remote from the environment, or any combination thereof. Likewise, the computing resource(s) 203 may be configured to communicate over a network 302 with input components 301, output components 311 and/or directly with the portable device 305 and/or the user 304.

As illustrated, the computing resource(s) 203 may be remote from the environment and implemented as one or more servers 303(1), 303(2), . . . , 303(P) and may, in some instances form a portion of a network-accessible computing platform implemented as a computing infrastructure of processors, storage, software, data access, and so forth that is maintained and accessible by components/device of the inventory management system 150 and/or the portable device 305 via a network 302 such as the Internet. For example, the computing resources 203 may process images of users to identify expressions (microexpressions, macroexpressions, gestures) and determine whether assistance is to be provided to the user. The computing resource(s) 203 do not require end-user knowledge of the physical location and configuration of the system that delivers the services. Common expressions associated for these remote computing resource(s) 203 include "on-demand computing," "software as a service (SaaS)," "platform computing," "network-accessible platform," "cloud services," "data centers," and so forth.

Each of the servers 303(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
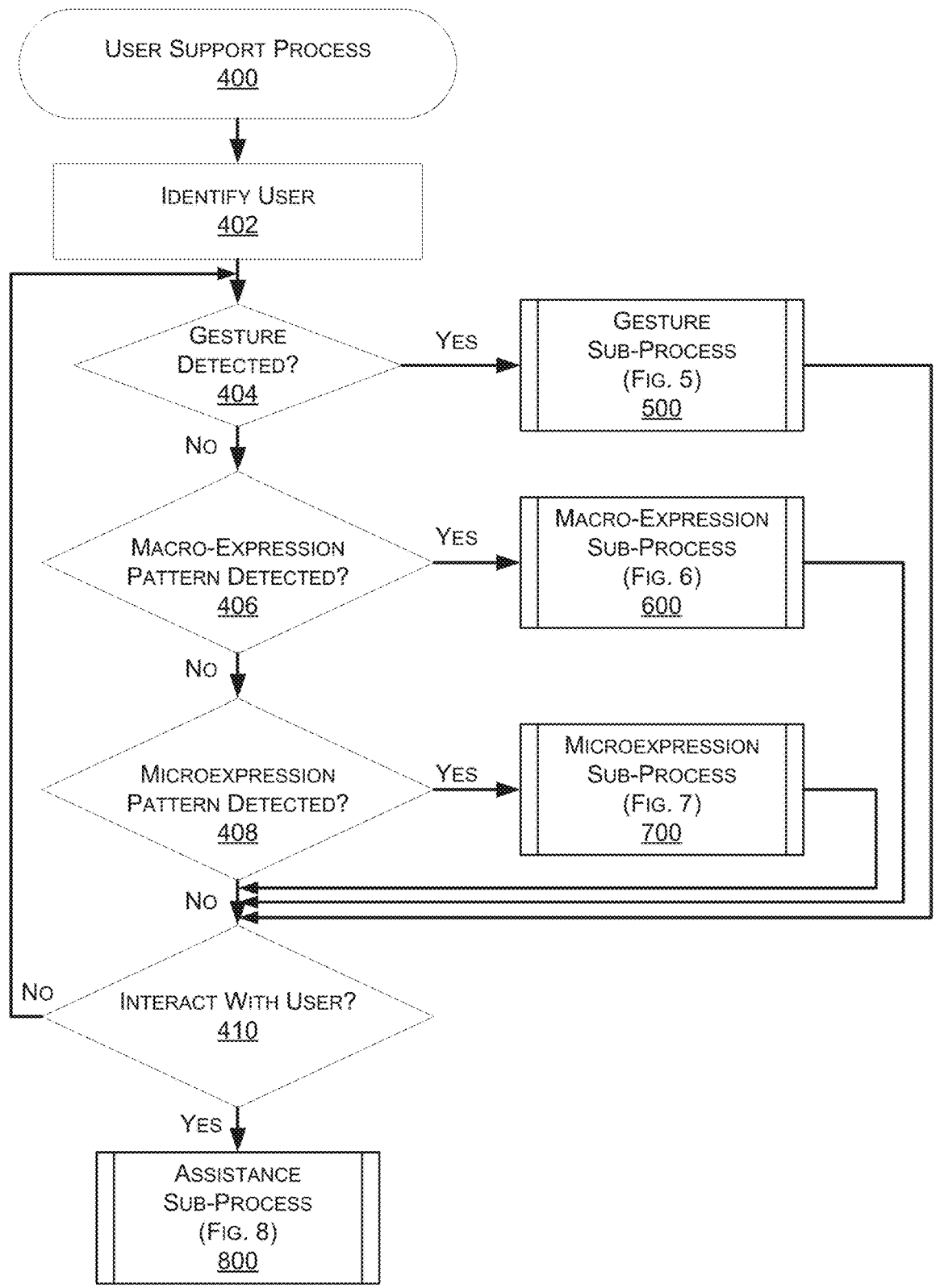
FIG. 4 depicts a flow diagram of an example process for providing user assistance based on expressions, according to some implementations.

FIG. 4 depicts a flow diagram of an example process 400 for providing assistance to a user, according to some implementations. The process of FIG. 4 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins by identifying a user within the materials handling facility, as in 402. Various techniques may be used to identify a user. For example, image capture and facial recognition may be used. In another example, the user may identify themself with a personal identifier (e.g., badge), RFID card, etc. In some implementations, the user has a portable device that may be detected when the user enters the materials handling facility. The portable device may include a unique identifier that is provided to the inventory management system 150 and used to identify the user.

As the user progresses through the materials handling facility, a determination may be made as to whether one or more expressions (e.g., gestures, macroexpressions, microexpressions) are presented by the user. While the example process 400 describes expression detection in a serial fashion, in some implementations, the inventory management system 150 implementing the example process 400 may detect any expressions, or combination of expressions, in parallel. In some implementations, images of the user may be captured by one or more image capture devices (e.g., video cameras, still cameras) and provided to the inventory management system for processing. The inventory management system may process the images to determine if the user is presenting one or more expressions. For example, a determination may be made as to whether a gesture, such as the user raising their hand, is detected, as in 404. If it is determined that a gesture is detected, the gesture sub-process 500 is performed. The gesture sub-process 500 is discussed in further detail below with respect to FIG. 5.

The example process 400 may also determine if one or more macroexpressions are detected, as in 406. Macroexpressions typically last" seconds to 4 seconds and are often presented by users when performing a task. There are seven universally expressed and recognized facial expressions of emotion (joy, sadness, fear, surprise, anger, contempt and disgust). Detecting these expressions can be beneficial in determining if a user needs assistance. If a macroexpression is detected, the macroexpression sub-process 600 is performed. The macroexpression sub-process 600 is discussed in further detail below with respect to FIG. 6.

Likewise, the example process 400 may determine if one or more microexpressions are detected, as in 408. Similar to macroexpressions, microexpressions are presented on a user's face, but typically last less than ½ seconds. Generally, microexpressions are involuntary expressions that are presented by a user to reflect their emotions (joy, sadness, fear, surprise, anger, contempt and disgust). If a microexpression is detected, the microexpression sub-process 700 is performed. The microexpressions sub-process 700 is discussed in further detail below with respect to FIG. 7.

Upon completion the gesture sub-process 500, macroexpression sub-process 600, microexpression sub-process 700, or if it is determined that there are no expressions detected, a determination is made as to whether to interact with the user, as in 410. If it is determined that interaction is to be provided to the user, the assistance sub-process 800 is performed. The assistance sub-process 800 is discussed in further detail below with respect to FIG. 8. However, if it is determined not to interact with the user, the example process 400 returns to decision block 404 and continues.

In some implementations, the user's body position, position of the user's head and/or orientation of the user's eyes may also be tracked to assist in determining whether to interact with the user. For example, as part of any of the sub-processes 500, 600, 700 the gaze direction (where the user is looking) of the user may be identified to further assist in determining what the user is looking at and/or how to assist the user.

Figure 5:
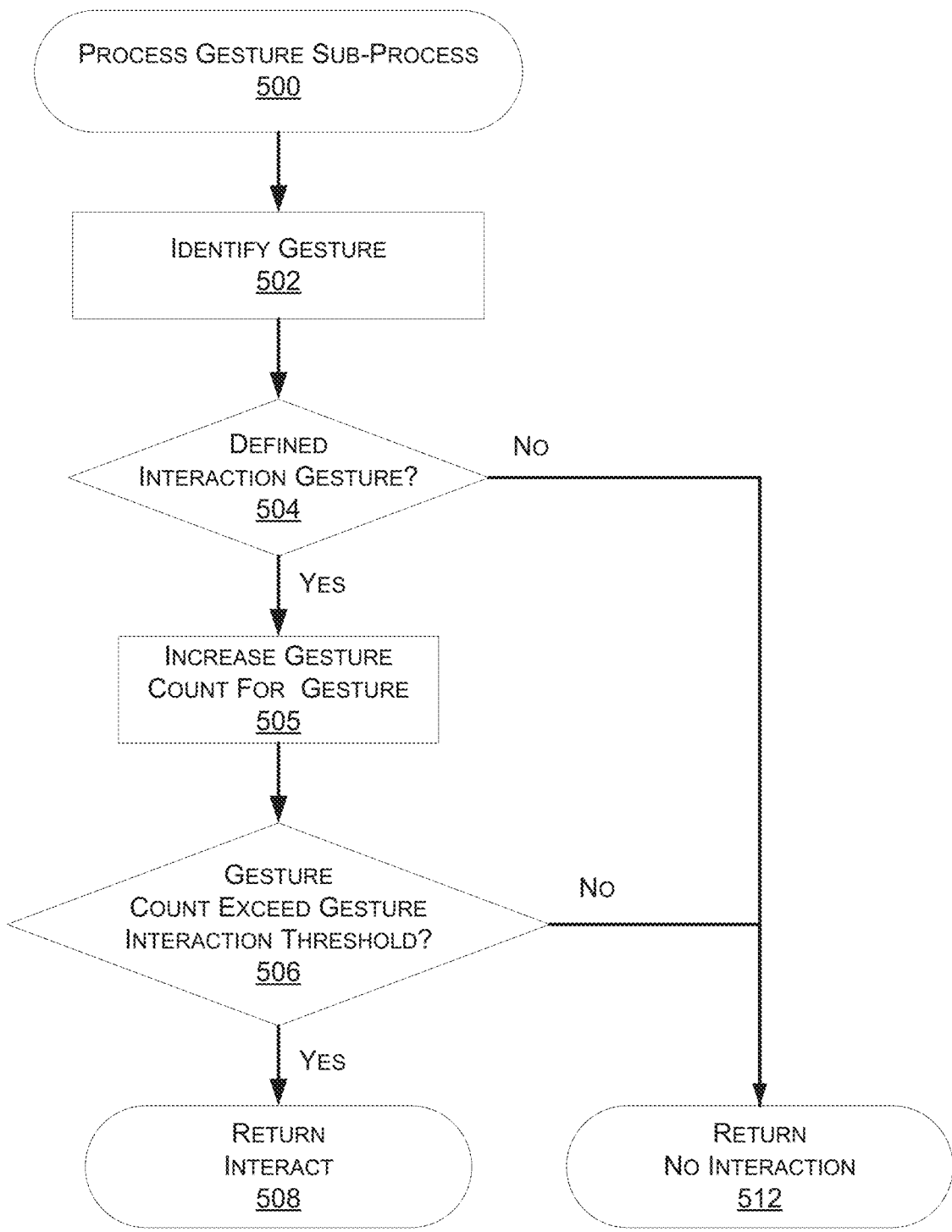
FIG. 5 depicts a flow diagram of an example gesture sub-process for processing gestures, according to some implementations.

FIG. 5 depicts a flow diagram of a sub-process 500 for processing gestures, according to some implementations. Upon detection of a gesture, the example gesture sub-process 500 identifies the gesture, as in 502. A gesture may be any specific movement of the user. For example, a gesture may be a user raising one or more hands, shaking their head, walking a distance in one direction, turning and walking back in the opposite direction, etc. Upon gesture identification, a determination is made as to whether the gesture is a defined interaction gesture, as in 504.

In some implementations, the example sub-process 500 may also determine the direction in which the user is facing, their head position and/or the direction of the user's gaze. Such information may be used to assist in determining whether the gesture is intended to invoke an interaction from the inventory management system. For example, if the user is looking at another person that is approaching and the user raises their hand (a potential defined interaction gesture) the example sub-process 500 may determine that the gesture was intended for the approaching person, and not intended to result in an interaction by the inventory management system.

In some implementations, the inventory management system 150 may include a list of defined interaction gestures that are associated with specific actions. For example, a user raising their hand may be a defined interaction gesture that, when identified, results in assistance being provided to the user. Any number and/or type of gesture may be included as a defined interaction gesture. If it is determined that the gesture is not a defined interaction gesture, the example gesture sub-process 500 completes, as in 512. However, if the gesture is a defined interaction gesture, a gesture count associated with the user is increased, as in 505, and a determination is made as to whether the gesture count exceeds a gesture interaction threshold, as in 506.

The gesture count may be a count of gestures that have been detected while the user is in a location of the materials handling facility and/or detected over a period of time. In some instances, the gesture count may be a single gesture. The gesture interaction threshold may be any defined count of gestures detected for a user during a period of time and/or within a location of the materials handling facility. In some instances, the gesture interaction threshold may only require a single gesture. In other instances, it may require a higher count of gestures. Likewise, the gesture interaction threshold may be different for different users and/or different for different areas of the materials handling facility.

If the gesture count does not exceed the gesture interaction threshold, a decision to not interact with the user is returned, as in 512. If it is determined that the gesture count does exceed the gesture interaction threshold, the example gesture sub-process 500 returns a decision to interact and provide assistance to the user, as in 508.

Figure 6:
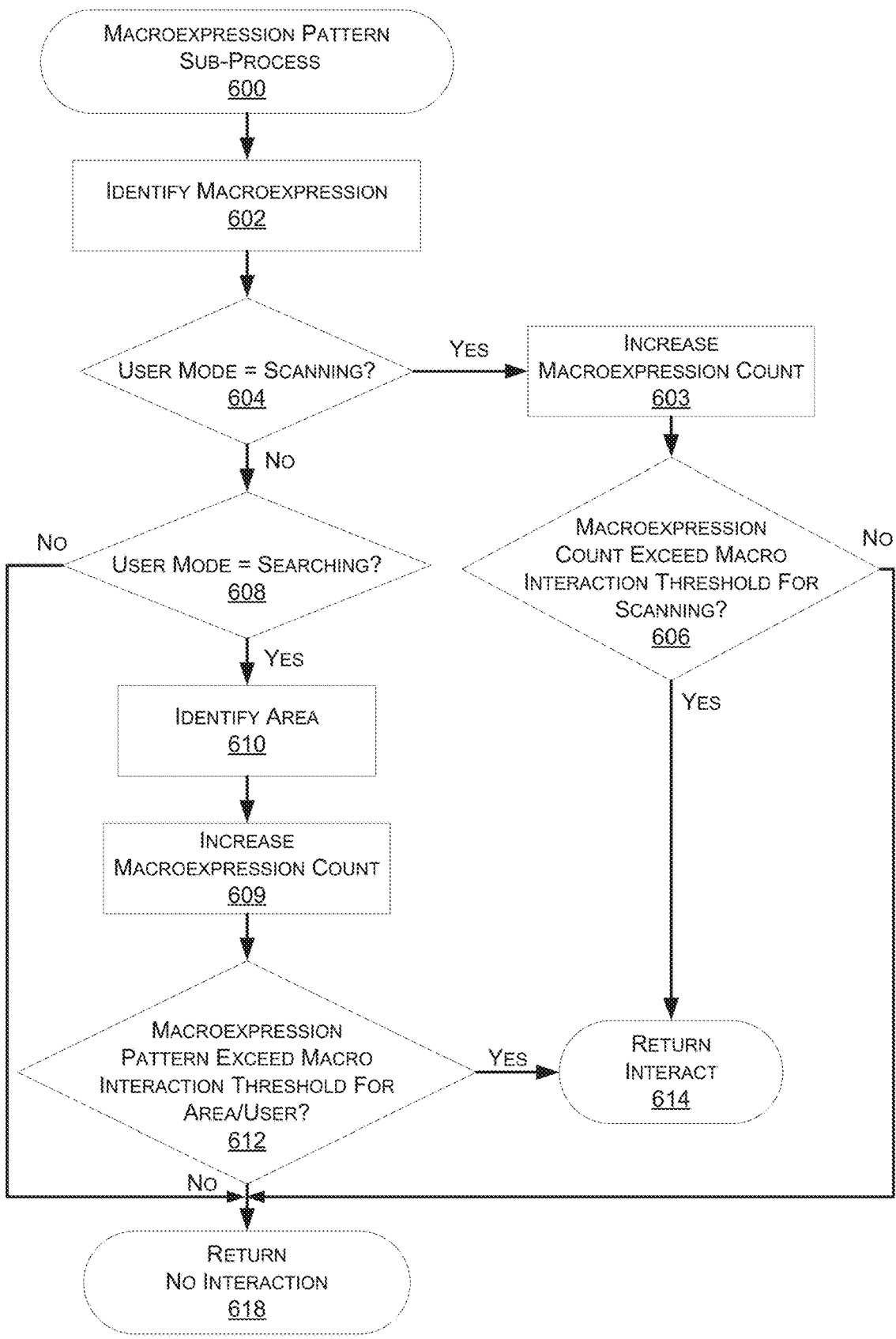
FIG. 6 depicts a flow diagram of an example macroexpression sub-process for processing macroexpressions, according to some implementations.

FIG. 6 depicts a flow diagram of an example macroexpression sub-process 600 for processing macroexpressions, according to some implementations. The example macroexpression sub-process 600 begins by identifying a macroexpression, as in 602 and then a determination is made as to whether the user mode is scanning, as in 604. A user may be determined to be in a scanning mode based on the user's behavior within the materials handling facility. For example, if the user is moving quickly between aisles of inventory and/or moving back and forth between aisles of inventory, it may be determined that the user is in scanning mode. In other implementations, the direction the user is facing, their head orientation and/or direction of the user's gaze may be identified and used to determine whether the user is in scanning mode and/or searching mode. For example, if the user is looking between different aisles or aisle identifiers, the movement of the user's head and/or direction of their gaze may be identified to assist in determining that the user is in scanning mode.

If it is determined that the user is in scanning mode, a macroexpression count associated with the user is increased, as in 603, and a determination is made as to whether the macroexpression count exceeds the macroexpression interaction threshold, as in 606. The macroexpression interaction threshold may be similar to the gesture interaction threshold. For example, the macroexpression interaction threshold may be any defined count of macroexpression detected for a user during a period of time, while the user is in scanning mode and/or while the user is within a location of the materials handling facility. In some instances, the macroexpression interaction threshold may be a single macroexpression. In other instances, it may require a higher count of macroexpressions. Likewise, the macroexpression interaction threshold may be different for different users, different for different areas of the materials handling facility and/or be dependent on whether the user is in searching mode or scanning mode. For example, some users may experience frustration faster in some areas of the material handling facility such that the macroexpression interaction threshold is lower in those areas for those users.

If it is determined that the macroexpression count exceeds the macroexpression interaction threshold, the example macroexpression sub-process 600 returns a result to interact and provide assistance to the user, as in 614.

Returning to decision block 604, if it is determined that the user mode is not scanning, a determination is made as to whether the user mode is searching, as in 608. Similar to the scanning mode, it may be determined that a user is in searching mode based on the user's movement patterns with the materials handling facility, body position, head position and/or gaze direction. For example, if the user remains within a defined area of the materials handling facility, such as a 10 foot radius, but is looking at different items, it may be determined that the user has located the area but is searching for a particular item. In some implementations, searching mode may be detected by a user looking at different, but related items in an area. For example, if a user picks up multiple items in the area and is looking back and forth at those items, it may be determined that the user is in searching mode. As another example, if the user is walking up and down a particular aisle and it is detected that the user's gaze is directed toward related but different objects on that aisle, it may be determined that the user is in searching mode—they are searching for a particular item.

If it is determined that the user is in searching mode, the macroexpression count associated with the user is increased, as in 609, and the area of the materials handling facility in which the user is located is identified, as in 610. A determination may then be made as to whether the macroexpression pattern exceeds the macroexpression interaction threshold, as in 612. As noted above, the macroexpression interaction threshold may vary depending on the location of the user within the materials handling facility and/or the user. For example, based on past experience with the user, the macroexpression interaction threshold may vary for different areas. In other instances, the macroexpression interaction threshold may vary by user characteristics. To illustrate, it may be determined that users over the age of 50 often need assistance in areas of the materials handling facility that include electronics. As such, the macroexpression interaction threshold may be lower in those areas for those in that age group.

If it is determined at decision block 612 that the macroexpression count exceeds the macroexpression interaction threshold, the example macroexpression sub-process 600 returns a decision to interact and provide assistance to the user, as in 614. If the macroexpression count does not exceed the macroexpression interaction threshold a decision to not interact with the user is returned, as in 618. Likewise, if it is determined that the user is not in the scanning or searching mode, the example macroexpression sub-process 600 may return a decision to not interact with the user. It may be determined that a user is not in the scanning or searching mode based on the behavior of the user within the materials handling facility. For example, if the user is standing in an area of the materials handling facility talking with another user, or talking on a mobile phone, it may be determined that the user is not in the scanning or searching mode.

Figure 7:
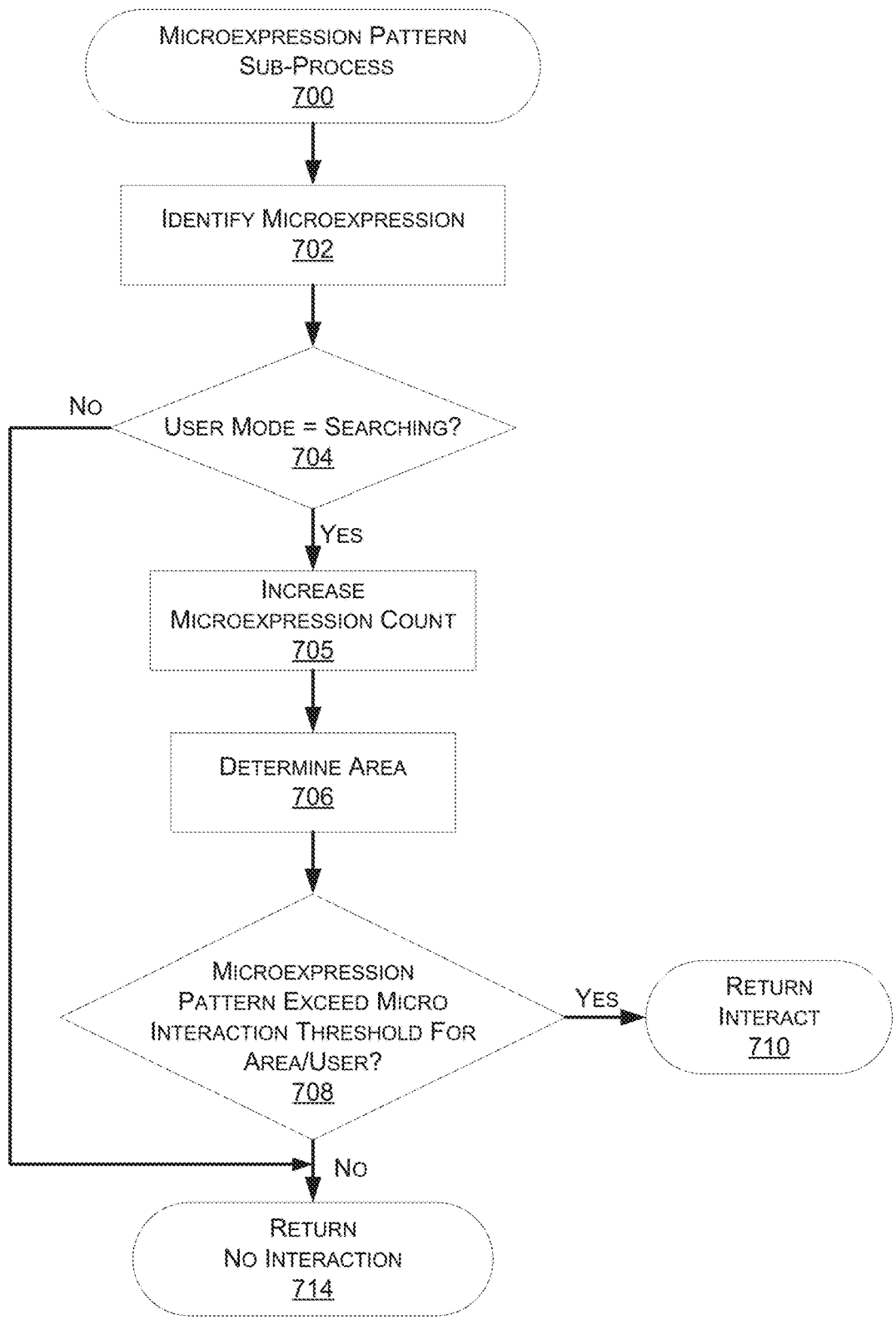
FIG. 7 depicts a flow diagram of an example microexpression sub-process for processing microexpressions, according to some implementations.

FIG. 7 depicts a flow diagram of an example microexpression sub-process 700 for processing microexpressions, according to some implementations. The example microexpression sub-process 700 begins by identifying a microexpression, as in 702, and then a determination is made as to whether the user mode is searching, as in 704. Similar to the searching mode discussed above, searching mode may be determined based on the movement patterns of the user with the materials handling facility, body position, head orientation, and/or gaze direction. For example, if the user remains within a defined area of the materials handling facility, such as a 10 foot radius, it may be determined that the user has located the area but is searching for a particular item.

If it is determined that the user is in searching mode, the microexpression count associated with the user is increased, as in 705, and the area of the materials handling facility in which the user is located is identified, as in 706. A determination may then be made as to whether the microexpression count exceeds the microexpression interaction threshold, as in 708. As with the macroexpression interaction threshold, the microexpression interaction threshold may vary depending on the location of the user within the materials handling facility and/or the user. For example, based on past experience with the user, the microexpression interaction threshold may vary for different areas. In other instances, the microexpression interaction threshold may vary by user characteristics.

If it is determined at decision block 708 that the microexpression count exceeds the microexpression interaction threshold, the example microexpression sub-process 700 returns a decision to interact and provide assistance to the user, as in 710. If the microexpression count does not exceed the microexpression interaction threshold, a decision to not interact with the user is returned, as in 714. Likewise, if it is determined that the user is not in the searching mode, the example microexpression sub-process 700 may return a decision to not interact with the user.

While the above description for FIGS. 5-7 reference counting the expressions by expression type and determining if the interaction threshold has been exceeded, in some implementations, expression counts may consider all types of expressions (e.g., gestures, macro, micro) and a single determination may be made as to whether an expression interaction threshold has been exceeded. Like the other interaction thresholds, the expression interaction threshold may vary depending on the mode (searching, scanning), the location of the user within the materials handling facility and/or based on the user and/or user characteristics.

Figure 8:
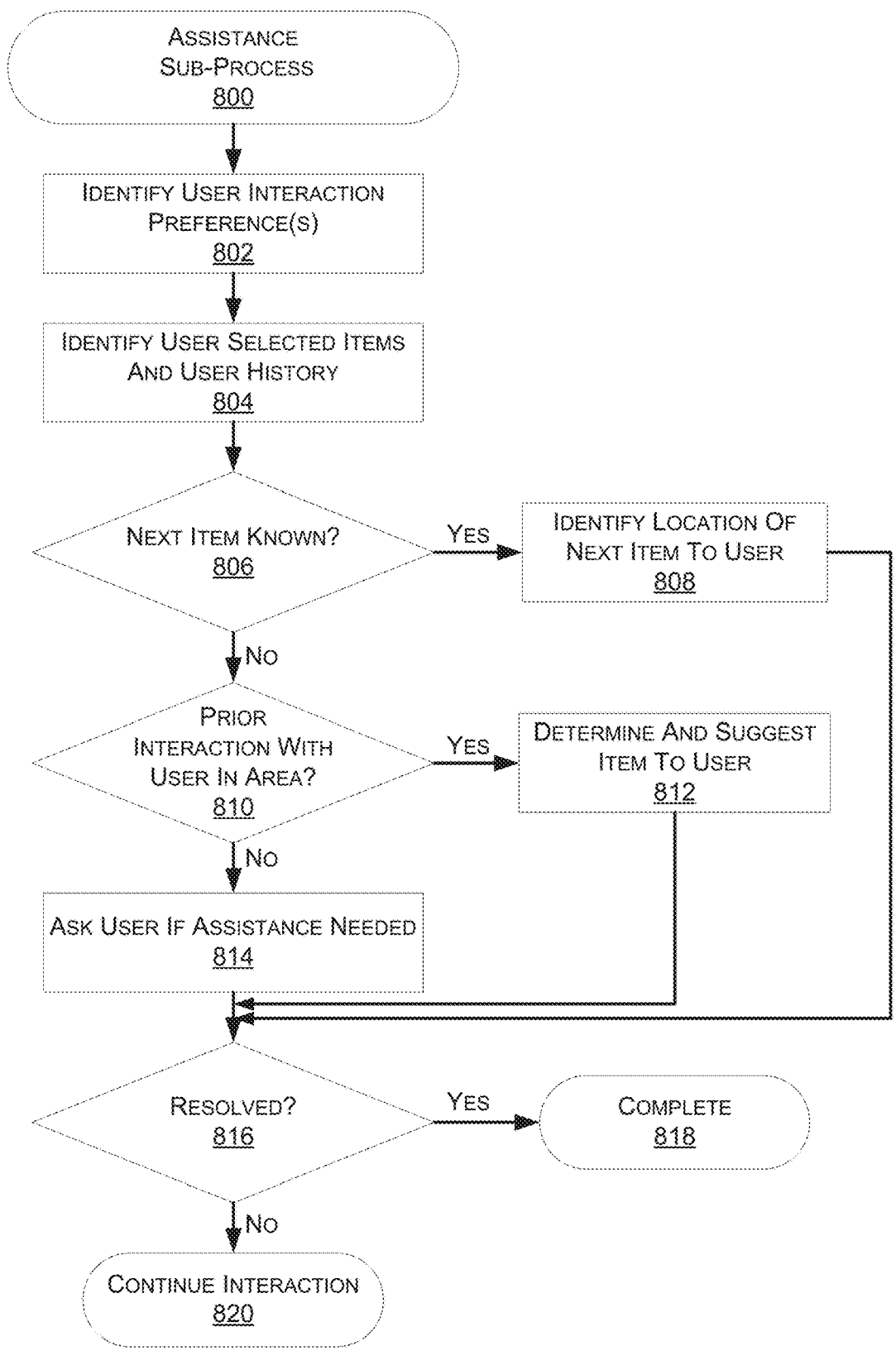
FIG. 8 depicts a flow diagram of an example sub-process for initiating interaction with a user, according to some implementations.

FIG. 8 depicts a flow diagram of an example assistance sub-process 800 for initiating interaction to provide assistance to a user, according to some implementations. The example sub-process 800 begins by identifying a user interaction preference(s), as in 802. User interaction preferences may be one or more interaction preferences specified by a user, selected based on past interactions with the user, based on interactions with other users, and the like. Interaction preferences may include one or more of automated interaction (e.g., audible, visual, and/or haptic) and/or in-person interaction. For example, a user may have an interaction preference of receiving assistance via presentation on a display located at or near the area in which the user is located. In other examples, a user's interaction preference may specify that the user prefers to receive information via their mobile device. In still other examples, the user interaction preference may be to have an associate arrive at the location of the user to provide in-person assistance. In some implementations, the user interaction preference may vary depending on the location of the user, the user mode (searching or scanning), based on the time of day, the user, etc. Likewise, in some implementations, the interaction preference may alter based on prior interactions with the user. For example, if the user initially receives assistance via a presentation on a display and it is determined that additional information is still needed, the interaction may modify such that an associate is dispatched to the location of the user to provide in-person assistance.

In still other examples, the user interaction preference(s) may be updated based on prior interaction experiences with the users. For example, if the user has received both in-person interaction and audio feedback interactions and the following results (e.g., resolution, facial expressions of the user) were more positive for the in-person interaction, such information may be used to assist in selection of the interaction preference in the future.

In addition to determining the interaction preference(s), the user selected items and/or user history may also be identified, as in 804. User selected items and/or user history may be utilized to guide the interaction provided to the user. For example, if the list of items to be picked is known and the user selected items already picked are determined, this information can be used to determine the item for which the user is searching.

A determination may then be made as to whether the item for which the user is searching is known, as in 806. If it is determined that the next item is known, the preferred interaction preference is determined and the location of the item is presented to the user according to the preferred interaction preference, as in 808. However, if the item is not known, a determination may be made as to whether a prior interaction with the user has occurred in the area of the materials handling facility where the user is located, as in 810. If a prior interaction has occurred and/or the user has previously picked an item from that area, such information may be utilized to estimate a likely candidate item for which the user is searching or to provide other forms of assistance to the user (e.g., item information). Other factors may also be considered. For example, it may be determined whether items have been moved from that area of the materials handling facility that were in that area during the user's prior visits to that area of the materials handling facility. In some implementations a list of potential items may be identified as likely next items for the user. Upon determining the likely item, or a list of likely items for which the user is searching, assistance in the form of a suggestion may be provided to the user according to the user's interaction preference, as in 812.

In some implementations, a threshold or confidence level may be considered before suggesting an item to the user. For example, the example sub-process 800 may require that the item or items to be suggested must have at least a 50% confidence threshold that the item is likely the item for which the user is searching. The confidence threshold may be any defined number.

However, if the example sub-process 800 cannot determine the item for which the user is searching or identify one or more items to suggest, an inquiry may be provided to the user to ask whether assistance is needed, as in 814. After asking if the user needs assistance, after identifying the location of the next item or after suggesting one or more items (collectively referred to as providing assistance), a determination may be made as to whether the cause for the assistance has been resolved and the assistance should be terminated, as in 816. If it is determined that the cause of the assistance has been resolved, the assistance is terminated and the example process completes, as in 818. However if the user still needs assistance, assistance is continued, as in 820.

Figure 9:
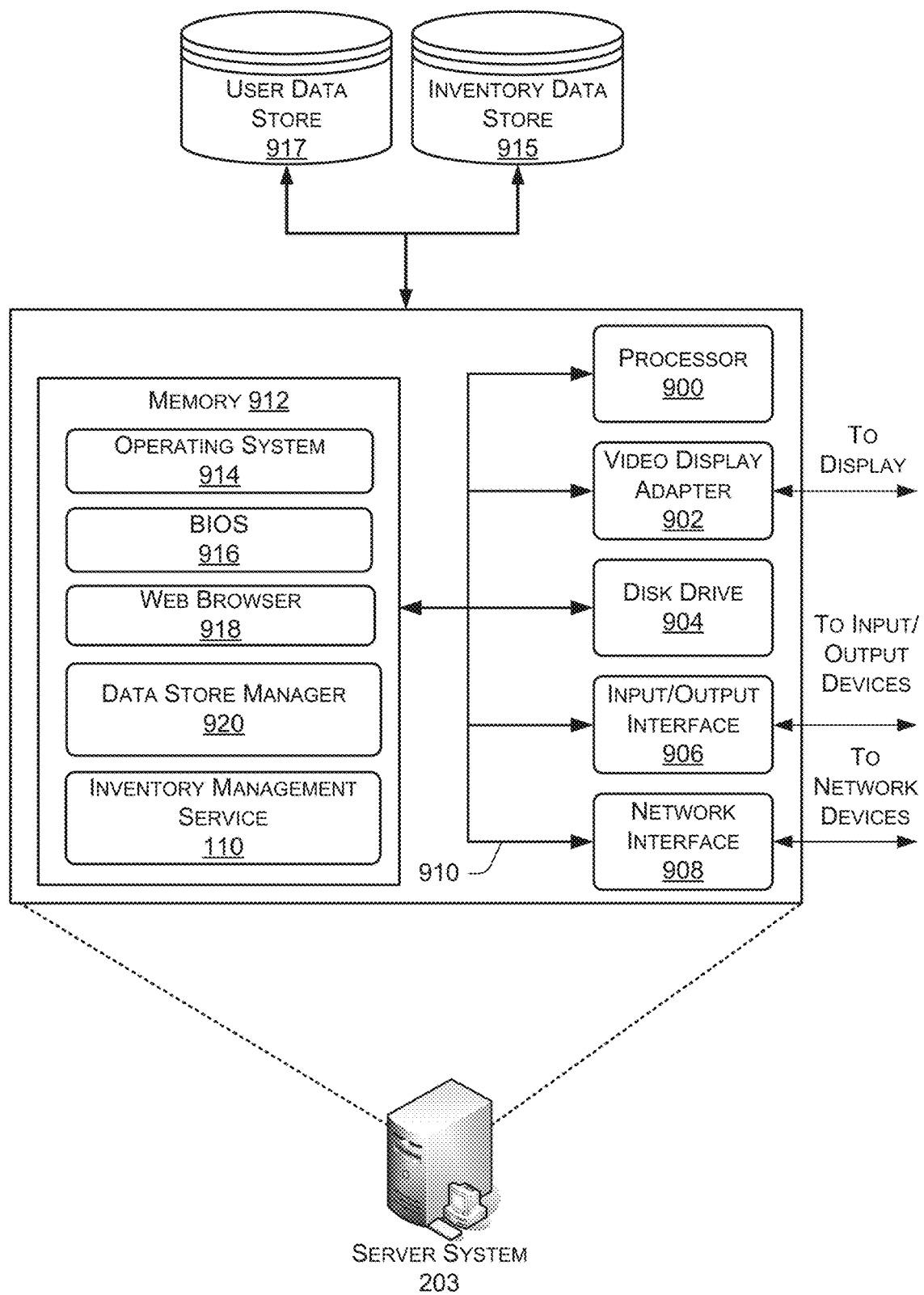
FIG. 9 is a block diagram of an illustrative implementation of a server system that may be used with various implementations.

FIG. 9 is a pictorial diagram of an illustrative implementation of a server system, such as the server system 203 that may be used in the implementations described herein. The server system 203 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display (not shown in FIG. 9) permitting an operator of the server system 203 to monitor and configure operation of the server system 203. The input/output interface 906 likewise communicates with external input/output devices not shown in FIG. 9, such as a mouse, keyboard, scanner, or other input and output devices that can be operated by an operator of the server system 203. The network interface 908 includes hardware, software, or any combination thereof, to communicate with other computing devices. For example, the network interface 908 may be configured to provide communications between the server system 203 and other computing devices via the network 202, as shown in FIG. 2.

The memory 912 generally comprises random access memory (RAM), read-only memory (ROM), flash memory, and/or other volatile or permanent memory. The memory 912 is shown storing an operating system 914 for controlling the operation of the server system 203. A binary input/output system (BIOS) 916 for controlling the low-level operation of the server system 203 is also stored in the memory 912.

The memory 912 additionally stores program code and data for providing network services that allow the inventory management system 150 to determine whether assistance is to be provided to users. Accordingly, the memory 912 may store a browser application 918. The browser application 918 comprises computer executable instructions, that, when executed by the processor 900 generate or otherwise obtain configurable markup documents such as Web pages. The browser application 918 communicates with a data store manager application 920 to facilitate data exchange between the inventory data store 915 and/or the user data store 917.

As used herein, the term "data store" refers to any device or combination of devices capable of storing, accessing and retrieving data, which may include any combination and number of data servers, databases, data storage devices and data storage media, in any standard, distributed or clustered environment. The server system 203 can include any appropriate hardware and software for integrating with the data stores 915, 917 as needed to execute aspects of the inventory management system 150.

The data stores 915, 917 can include several separate data tables, databases or other data storage mechanisms and media for storing data relating to a particular aspect. For example, the data stores 915, 917 illustrated include mechanisms for inventory information, user information, etc. which can be used to determine whether assistance should be provided to a user.

It should be understood that there can be many other aspects that may be stored in the data stores 915, 917. The data stores 915, 917 are operable, through logic associated therewith, to receive instructions from the server system 203 and obtain, update or otherwise process data in response thereto.

In addition to maintaining information about inventory and determining whether to provide assistance, the inventory management system 150 may provide assistance to the users. For example, the inventory management system 150, through communication between the server system 203, may provide information about an item to a user to which assistance is to be provided.

The memory 912 may also include the inventory management system 150, discussed above. The inventory management system 150 may be executable by the processor 900 to implement one or more of the functions of the server system 203. In one implementation, the inventory management system 150 may represent instructions embodied in one or more software programs stored in the memory 912. In another implementation, the inventory management system 150 can represent hardware, software instructions, or a combination thereof.

The server system 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
 under control of one or more computing devices configured with executable instructions,
  identifying a user within a materials handling facility;
  detecting a facial expression of emotion presented by the user, wherein the facial expression of emotion is at least one of a macroexpression or a microexpression;
  in response to detecting the facial expression of emotion, increasing an expression count for the user;
  determining, based at least in part on one or more of a position of the user within the materials handling facility, the user, or a user characteristic, a threshold, wherein the threshold varies for different users based on one or more of the position of the user within the materials handling facility, the user, or the user characteristic;
  determining that the expression count exceeds the threshold;
  in response to determining that the expression count exceeds the threshold, determining that assistance is to be provided to the user;
  determining an assistance to be provided to the user based at least in part on the facial expression of emotion and one or more of a prior interaction with the user, an item for the user, a user history, a movement of the user, a location of the user within the materials handling facility, a user preference, a user profile, an expression count corresponding to the expression, or at least one item selected by the user; and
  causing assistance to be provided to the user.

2. The method of claim 1, further comprising:
 determining, based at least in part on a movement of the user within the materials handling facility, that the user is in a searching mode or a scanning mode;
 determining, based at least in part on an item pick list associated with the user, the item, wherein the item is an item that may be picked by the user; and
 wherein the assistance includes one or more of an audible or visible indication regarding the item.

3. The method of claim 1, wherein determining the item further includes:
 determining, based at least in part on an item pick list associated with the user, a first plurality of items indicated on the item pick list;
 determining a second plurality of items that have already been picked by the user while located in the materials handling facility; and
 determining, based at least in part on a difference between the first plurality of items and the second plurality of items, the item.

4. The method of claim 1, further comprising:
 determining an interaction preference for the user, wherein the interaction preference is determined based at least in part on a prior interaction with the user, or a user specified interaction preference.

5. The method of claim 4, wherein the interaction preference is at least one of an audio output, a video output, an in-person interaction, or a haptic output.

6. The method of claim 1, wherein the assistance includes at least one of: audible information, visual information, haptic information, identifying a location of the item, outputting item information corresponding to the item, projecting a light onto the item to identify a location of the item, dispatching an associate, asking the user if assistance is needed, providing information about a plurality of items, providing non-product related information, or causing medical assistance to be provided.

7. The method of claim 1, wherein detecting the facial expression of emotion presented by the user further includes:
comparing the facial expression of emotion with stored expression information.

8. The method of claim 1, further comprising:
subsequent to providing assistance, detecting a second expression presented by the user;
determining, based at least in part on the second expression, that assistance is still needed by the user; and
altering a form of the assistance provided to the user.

9. A system, comprising:
a plurality of cameras positioned within a materials handling facility and remote from a user, each camera of the plurality of cameras configured to generate images of objects located within the materials handling facility;
one or more processors; and
a memory coupled to the one or more processors and storing program instructions that when executed by the one or more processors cause the one or more processors to at least:
monitor a position of a user within a materials handling facility;
detect a facial expression of emotion presented by the user, wherein the facial expression of emotion is at least one of a macroexpression or a microexpression;
in response to detection of the facial expression of emotion, increase an expression count for the user;
determine, based at least in part on one or more of the position of the user within the materials handling facility, the user, or a user characteristic, a threshold, wherein the threshold varies for different users based on one or more of the position of the user within the materials handling facility, the user, or the user characteristic;
determine that the expression count exceeds the threshold;
in response to determination that the expression count exceeds the threshold and based at least in part on the position of the user, determine that assistance is to be provided to the user;
determine an assistance to be provided to the user based at least in part on one or more of the facial expression of emotion, a prior interaction with the user, an item for the user, a user history, a movement of the user, or at least one item selected by the user; and
cause the assistance to be provided to the user.

10. The system of claim 9, wherein the program instructions that when executed by the one or more processors further cause the one or more processors to at least:
determine, based at least in part on the position of the user and a movement of the user within the materials handling facility, that the user is in a searching mode or a scanning mode;
determine, based at least in part on an item pick list associated with the user, the item, wherein the item is an item that may be picked by the user; and
wherein the assistance includes an audible or visible indication regarding the item.

11. The system of claim 9, wherein the program instructions that when executed by the one or more processors cause the one or more processors to determine the item further include instructions that when executed by the one or more processors cause the one or more processors to at least:
determine, based at least in part on an item pick list associated with the user, a first plurality of items indicated on the item pick list;
determine a second plurality of items that have already been picked by the user while located in the materials handling facility; and
determine, based at least in part on a difference between the first plurality of items and the second plurality of items, the item.

12. The system of claim 11, wherein the item is further determined based at least in part on the position of the user.

13. The system of claim 9, wherein the program instructions when executed by the one or more processors further cause the one or more processors to at least:
determine an interaction preference for the user, wherein the interaction preference is determined based at least in part on a prior interaction with the user, or a user specified interaction preference.

14. The system of claim 13, wherein the interaction preference is at least one of an audio output, a video output, an in-person interaction, or a haptic output.

15. The system of claim 9, wherein the assistance includes at least one of: audible information, visual information, haptic information, identifying a location of the item, outputting item information corresponding to the item, projecting a light onto the item to identify a location of the item, dispatching an associate, asking the user if assistance is needed, providing information about a plurality of items, providing non-product related information, or causing medical assistance to be provided.

16. The system of claim 9, wherein the program instructions when executed by the one or more processors further cause the one or more processors to at least:
determine at least one of a gaze direction of the user, a body position of the user, or a head position of the user; and
wherein a determination of the item is further based at least in part on the gaze direction of the user, the body position of the user, or the head position of the user.

17. The system of claim 9, wherein the program instructions when executed by the one or more processors further cause the one or more processors to at least:
determine an interaction preference of the user; and
wherein the assistance is provided to the user in accordance with the interaction preference.

18. A computer-implemented method for providing assistance to users within a materials handling facility, comprising:
under control of one or more computing systems configured with executable instructions,
monitoring a movement of a user through a materials handling facility;
detecting a facial expression of emotion presented by the user, wherein the facial expression of emotion is at least one of a macroexpression or a microexpression;
in response to detecting the facial expression of emotion, increasing an expression count for the user;
determining, based at least in part on one or more of a position of the user within the materials handling facility, the user, or a user characteristic a threshold, wherein the threshold varies for different users based on one or more of the position of the user within the materials handling facility, the user, or the user characteristic;
determining that the expression count exceeds the threshold;

in response to determining that the expression count exceeds the threshold and based at least in part on the movement, determining that assistance is to be provided to the user;

determining an assistance to be provided to the user based at least in part on one or more of the facial expression of emotion, a prior interaction with the user, an item for the user, a user history, the movement of the user, or at least one item selected by the user; and causing the assistance to be provided to the user.

19. The computer-implemented method of claim 18, further comprising:

determining an interaction preference for the user, wherein the interaction preference is determined based at least in part on a prior interaction with the user, or a user specified interaction preference; and wherein the assistance is provided to the user in accordance with the interaction preference.

20. The computer-implemented method of claim 18, further comprising:

determining, based at least in part on an item pick list associated with the user, the item, wherein the item is an item that may be picked by the user; and wherein the assistance includes an audible or visible indication regarding the item.

21. The computer-implemented method of claim 18, wherein determining the item further includes:

determining, based at least in part on an item pick list associated with the user, a first plurality of items indicated on the item pick list;

determining a second plurality of items that have already been picked by the user while located in the materials handling facility; and determining, based at least in part on a difference between the first plurality of items and the second plurality of items, the item.

22. The computer-implemented method of claim 18, further comprising:

determining at least one of a gaze direction of the user, a body position of the user, or a head position of the user; and wherein determining that assistance is to be provided is further based at least in part on the gaze direction of the user, the body position of the user, or the head position of the user.

23. The computer-implemented method of claim 18, further comprising:

receiving at least one image of the user while the user is located in the materials handling facility; and processing the image to identify the user.

24. The computer-implemented method of claim 18, further comprising:

identifying the user based at least in part on one or more of an image of the user or a user identifier detected by an antenna positioned within the materials handling facility; and retrieving, from a data store, user information, wherein the user information indicates at least one of item retrieval history corresponding to the user, a view history corresponding to the user, a purchase history corresponding to the user, or a pick list of items to be picked by the user.

25. The computer-implemented method of claim 18, wherein monitoring the movement of the user includes:

detecting one or more identifiers corresponding to the user; and monitoring a position of the one or more identifiers.

26. The computer-implemented method of claim 25, wherein the one or more identifiers include one or more of a color of an item of clothing worn by the user, an identifier output by a device associated the user, or an RFID identifier corresponding to the user.

* * * * *